Dec. 1, 1931.   C. D. FARMER ET AL   1,834,692
COMPENSATED GYROSCOPIC COMPASS
Filed March 3, 1927    2 Sheets-Sheet 1
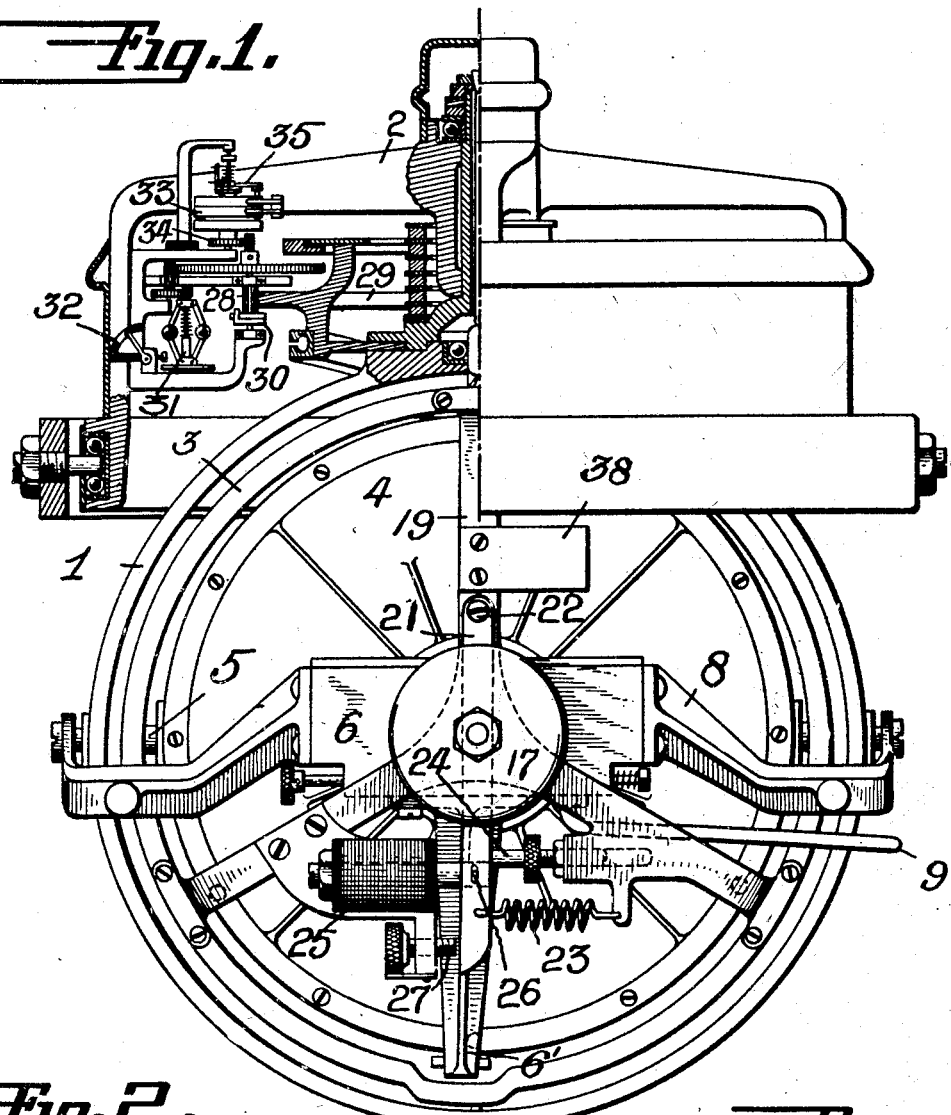
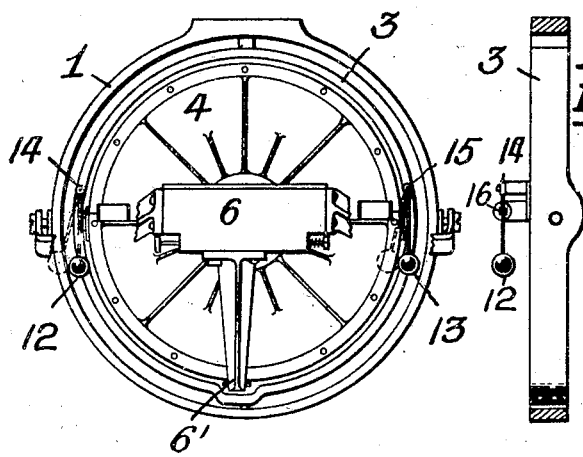
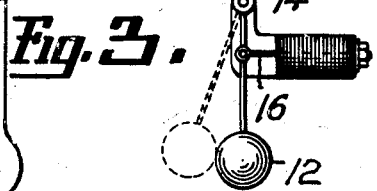
INVENTORS
CLAUDE D. FARMER
WILLIAM R. HIGHT.
BY Herbert H. Thompson
their ATTORNEY.

Dec. 1, 1931.  C. D. FARMER ET AL  1,834,692
COMPENSATED GYROSCOPIC COMPASS
Filed March 3, 1927  2 Sheets-Sheet 2
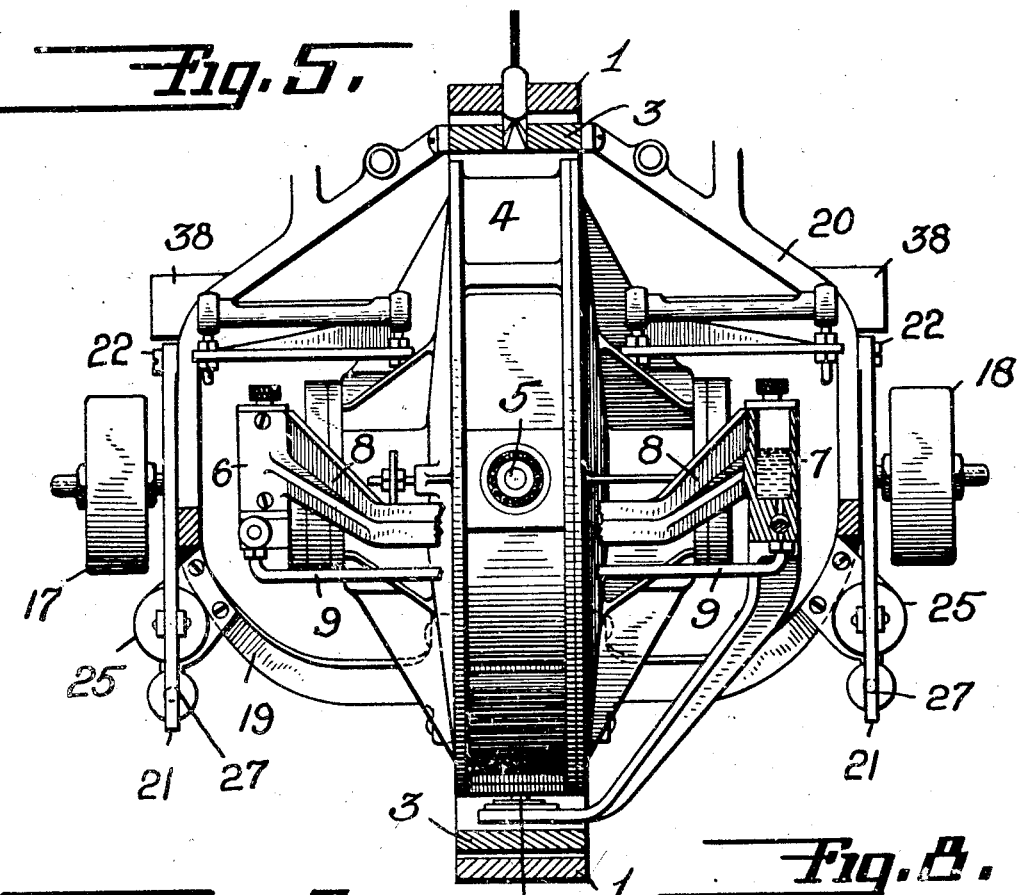
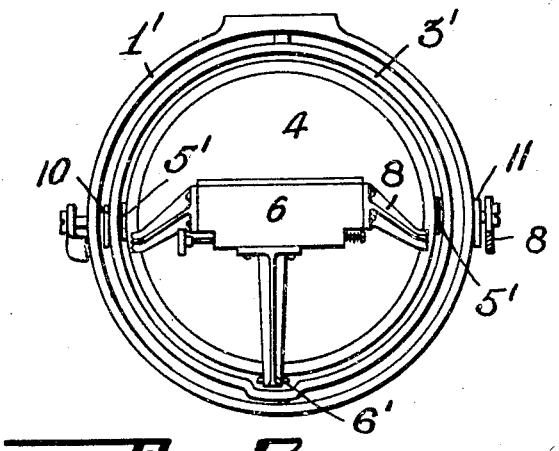
INVENTORS
CLAUDE D. FARMER
WILLIAM R. HIGHT
BY
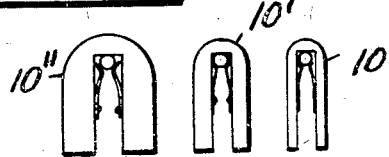
their ATTORNEY Patented Dec. 1, 1931

1,834,692

UNITED STATES PATENT OFFICE

CLAUDE D. FARMER, OF LONDON, ENGLAND, AND WILLIAM R. HIGHT, OF HOLLIS, NEW YORK, ASSIGNORS, BY MESNE ASSIGNMENTS, TO SPERRY GYROSCOPE COMPANY, INC., OF BROOKLYN, NEW YORK, A CORPORATION OF NEW YORK

COMPENSATED GYROSCOPIC COMPASS

Application filed March 3, 1927. Serial No. 172,238.

This invention relates to a means for preventing temporary oscillations in a gyroscopic compass during the turning or change of speed of the ship and more particularly concerns preventing the damping mechanism from tending to cause oscillations or deviation at this time. It has been found that regardless of the type of damper employed, all damping mechanisms during the time that the ship is accelerating (i. e. changing course or speed) have a disturbing effect and to remedy this it has been proposed to eliminate or greatly reduce the damping factor during this time. This method of preventing the trouble referred to, however, is not entirely satisfactory, first, since during the time that the damper is eliminated the compass is without damping mechanism and, therefore, its oscillations are undamped, so that if the ship is maneuvering, the average damping factor is so greatly reduced that the compass will not settle. Secondly, the elimination of the damping, especially where the damper exerts a torque about the vertical axis of the compass, gives rise to other lesser errors requiring additional mechanism to cope therewith if great precision is desired.

According to the present invention, we propose to avoid setting up oscillations from the damper, not by eliminating or even reducing the damper but by designing the compass in such a manner that the horizontal acceleration forces, which act through the damping mechanism to exert a torque on the compass, also act upon an unbalanced mass on the sensitive element which exerts an equal and opposite pressure or torque on the gyroscope to that exerted by the damping mechanism due to this cause. The damping effect, however, namely the torque exerted by the damping mechanism due to tilt, is left undisturbed so that the compass is at all times damped. In other words, the balancing mass is so arranged as not to affect the gyroscope gravitationally or, in other words, it is not affected by the tilt of the gyroscope. Preferably also the mass is so applied as not to disturb the horizontal or vertical balances of the compass. To the latter end the mass may be counter-balanced by a second mass placed so as not to affect the compass under the action of horizontal acceleration pressures, or said first mass may be movably mounted on the compass so that normally the system is balanced and it is only when the ship turns or accelerates that the mass is displaced so as to create under the action of the aforesaid horizontal acceleration pressures the desired torque or pressure.

Referring to the drawings in which, what we now consider the preferred forms of our invention are shown, Fig. 1 is a north elevation looking south, partly in section, of a gyroscopic compass with our invention applied thereto.

Fig. 2 is a similar view on a smaller scale and in diagrammatic form of a second form of our invention.

Fig. 3 is a vertical section through the vertical ring of Fig. 2, the gyro case being omitted.

Fig. 4 is a detailed view of the means for displacing the mass or masses shown in Figs. 2 and 3.

Fig. 5 is the vertical section through the center of Fig. 1, the gyro case, however, being shown in elevation.

Fig. 6 is a north elevation on a smaller scale of a third form of our invention, this form being the simplest.

Fig. 7 is a plan view of the masses which may be selectively used in the form shown in Fig. 6, different sizes of weights being used for different latitudes.

Fig. 8 is a wiring diagram showing the electric connection for actuating the shiftable weights of Figs. 1 to 5.

Our invention is shown as applied to the Sperry mercury-controlled type of gyroscopic compass, although it will be obvious that it may be applied to other types of compasses. Stated briefly, this type of compass comprises the follow-up element or support 1, which is journaled for turning about a vertical axis in the spider or supporting frame 2. Within the follow-up ring is suspended and pivotally mounted about a vertical axis the sensitive element comprising a vertical ring 3 and the gyroscope proper 4 supported on a horizontal trunnion axis 5 in said ring, the gyroscope being substantially balanced about said axis. The gravitational element in this compass comprises a pair of connected liquid containers 6 and 7 secured in a frame 8 pivoted to the follow-up frame 1, a small pipe 9 connecting the containers so that liquid may flow there between. The said frame is connected to a single point 6' on the gyro casing so as to apply the orienting torque thereto. This connection is usually placed slightly to the east of the vertical so that not only is the orienting or north seeking properties imparted to the compass but damping properties also, the former being due, of course, to the gravitational torque about the horizontal axis and the latter to the component of the torque about the vertical axis. Both torques are, of course, in reality but a single torque brought into operation by the preponderance of the mercury in one container which, of course, is usually caused by tilt of the compass. As soon as tilt occurs, therefore, both the north seeking and damping factors are brought into operation.

There will also be a displacement of mercury when the ship turns or changes speed due to the action of the N—S component of horizontal acceleration forces on the liquid. The resulting torque about the horizontal axis at this time is necessary and desirable, to give the compass the proper ballistic deflection. The component torque about the vertical axis, however, is both unnecessary and undesirable, and, therefore, as previously stated, it has been proposed to eliminate it. For example, see the patent to Herbert H. Thompson, No. 1,773,412, dated August 19, 1930 for gyroscopic compass. When this is done, however, the entire damping mechanism is rendered inoperative during this time so that if the compass is tilted the damping mechanism can have no effect. According to our invention, therefore, we propose to leave the eccentric connection, i. e. the damper, undisturbed.

As Figs. 6 and 7 represent the simplest form of our invention, this will be first referred to. In this form we provide some portion of the sensitive element, preferably the vertical ring 3' of the compass, with an unbalanced mass 10 preferably located near the horizontal axis 5' of the gyroscope. Said mass may be made a part of the vertical ring but is preferably separate therefrom, so that it may be changed for different latitudes. In Fig. 7, for instance, we show three such masses 10, 10' and 10", the smaller 10 being used for latitudes near the equator and the larger ones 10' and 10" at progressively higher latitudes. It should be noted that by locating this mass on the vertical ring, it exerts no torque about the horizontal axis of the gyroscope and leaves its balance about said axis undisturbed. Said mass is shown as located on the east side of the ring so that under the action of acceleration forces it will exert a pressure on the ring and hence through the trunnions 5' on the gyroscope in the opposite direction to that exerted by the eccentric connection, due to the surge of the mercury counter to the acceleration force, thereby preventing the compass from being disturbed. For the best operation, the compass as a whole should be stabilized. It should further be noted that the mass 10 exerts no torque about the horizontal axis of the gyroscope since it is located on the vertical ring. Therefore, the mass does not interfere with the ballistic action of the mercury ballistic 6 during changes of speed or course. In other words, the mass does not interfere with the securing of the proper ballistic deflection.

In order to maintain the vertical balances of the compass, we may mount an approximately equal mass 11 on the follow-up element 1' on the opposite side of the compass from the first-named mass. This mass will exert no torque at all on the sensitive element as it is on the follow-up element only. It is changed as masses 10, 10' and 10" are changed.

Instead of having a fixed mass, as shown in Fig. 6, and endeavoring to counter-balance it, we may provide masses which are normally balanced but which are moved into an out-of-balance position when the ship turns or accelerates, in which position either or both of them may exert the proper counter-acting pressure. A simple form of such device is shown in Figs. 2, 3 or 4. According to this form, equal masses 12 and 13 are movably mounted on opposite sides of the vertical ring so the system is normally balanced about all axes. As shown, said masses comprise small pendulums pivoted on the vertical ring at 14, 15 and normally hanging vertical. One or both of said pendulums are moved, however, by solenoids or the like which are connected by links 16 to the pendulums, said solenoids being in circuit with means hereinafter described, which is actuated on acceleration of the ship. When excited, said solenoids push the pendulums to the east, thereby placing an unbalanced weight or weights so that the horizontal acceleration forces acting thereon may exert a pressure on the gyro casing in the N—S direction and opposite in direction to the pressure exerted through the eccentric connection.

Figs. 1 and 5 illustrate the preferred form of our invention when movable masses are employed. In this form, instead of providing additional masses on the compass for the purpose specified, we prefer to make use of the compensator weights 17 and 18 now placed on the compass for this purpose. These masses are shown as mounted on brackets 19 and 20 secured to the vertical ring 3, but instead of being fixed thereto one or both of said masses are shown as pendulously mounted thereon by being secured to a lever 21 pivoted to the bracket at 22. Said lever normally hangs in a vertical position, spring 23 holding the same against an adjustable stop 24. A solenoid 25 mounted on said frame is connected to said lever by pin and slot connection 26 so that when excited it draws the lever to the east against adjustable stop 27 thereby shifting the adjacent compensator weight. It will be understood that both compensator weights are thrown in the same direction so that their effect is additive. The stops 27 are adjusted in accordance with the latitude for the same purposes as various masses were provided in connection with the form of our invention shown in Fig. 7.

Said solenoids are excited under the same circumstances as the solenoids of Figs. 2 to 4. In Fig. 1, however, the mechanism responsive to acceleration is illustrated in diagrammatic form, the same being shown more in detail in the copending application of Mr. L. F. Carter, Serial No. 125,383, filed July 28, 1926. Said mechanism consists essentially of step-up gearing 28 which meshes with large gear 29 on the follow-up element 1 and, therefore, is turned when the compass turns. Said gearing actuates through a lost motion device 30, a centrifugal governor 31, the latter operating when rotated for a predetermined time above a predetermined speed to close a switch 32 which excites the electromagnetic clutch 33, the latter thereby clutching the upper part thereof to be turned by gear 34. This operation, as explained in said Carter application, closes one or the other of contacts 35 or 36 after a predetermined rotation has taken place, thereby exciting solenoid 25 (see Fig. 8). In other words the switch is only closed by a substantial turning of the ship off its course, and not by the ordinary yawing of the ship or by the "hunting" action of the compass. There is also shown in circuit with said solenoids a second switch 37 which may be closed manually or by any suitable means not shown whenever the ship is changing speed. Masses 38 may be secured to frames 19 and 20 to counter-balance solenoids 25.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a gyro compass having a damper acting about the vertical axis of the compass, the combination with the sensitive element including a vertical ring, and the damping means, of a mass on the said vertical ring creating an unbalanced condition about the vertical axis thereof, to exert thereon an opposite torque to that produced by said damping means under the action of horizontally acting acceleration forces without materially affecting the damping action.

2. In a gyro compass having a damper acting about the vertical axis of the compass, the combination with the follow-up element, sensitive element including a vertical ring, and damping means, of a mass on the vertical ring so located as to exert thereon a torque opposing that produced by said damping means under the action of horizontally acting acceleration forces without materially affecting the damping action, and a second mass on the follow-up element on the opposite side of the center of the compass from said first mass for the purpose specified.

3. In a gyro compass having a vertical ring mounted for turning about a vertical axis, a gyroscope supported thereon for oscillation about a horizontal axis, a damper acting about the vertical axis of said gyroscope, and a mass on said vertical ring and adapted under the action of horizontal acceleration forces having a N—S component to balance the pressure on the gyroscope due to the action of such forces on said damper.

4. In a gyro compass having a vertical ring mounted for turning about a vertical axis, a gyroscope supported thereon for oscillation about a horizontal axis, a damper acting about the vertical axis of said gyroscope, a mass on said vertical ring, and means for shifting the same to an unbalanced position when the ship turns whereby it balances the pressure on the gyroscope due to the action of the turning forces on the damper.

5. In a gyro compass having a follow-up element and sensitive element, of a gravitational factor pivoted on the former having an eccentric connection to the gyroscope of the latter, whereby on tilt of the gyroscope or when the ship turns or accelerates a torque is exerted on the gyroscope which may be resolved into a torque about the horizontal axis and a torque about the vertical axis, and a mass located unsymmetrically on the sensitive element with respect to the vertical axis thereof so as to exert a torque on the gyroscope when the ship turns or accelerates which counterbalances the said component torque about said vertical axis only.

6. In a gyro compass having a follow-up element and sensitive element, of a pair of connected liquid containers pivoted on the former having an eccentric connection to the gyroscope, whereby on tilt of the gyroscope of the latter or when the ship turns or accelerates a flow of the liquid occurs resulting in a torque being exerted on the gyroscope which may be resolved into a torque about the horizontal axis and a torque about the vertical axis, and a mass located unsymmetrically on the sensitive element with respect to the vertical axis thereof so as to exert a torque on the gyroscope when the ship turns or accelerates which counterbalances the said component torque about said vertical axis only.

7. In a gyro compass having a vertical ring mounted for turning about a vertical axis, a gyroscope supported thereon for oscillation about a horizontal axis, a damper acting about the vertical axis of said gyroscope, compensating weights on said vertical ring, and means for shifting the same horizontally when the ship accelerates, for the purpose specified.

8. In a gyro compass having a vertical ring mounted for turning about a vertical axis, a gyroscope supported thereon for oscillation about a horizontal axis, a damper acting about the vertical axis of said gyroscope, compensator weights, means for movably mounting said weights on the vertical ring, and automatic means brought into action by continued relative turning of the compass for shifting one of said weights in an east-west direction from its normal position.

9. In a gyro compass having a vertical ring mounted for turning about a vertical axis, a gyroscope supported thereon for oscillation about a horizontal axis, a damper acting about the vertical axis of said gyroscope, a mass on said vertical ring, means for shifting the same to a position which unbalances said ring about its vertical axis when the ship turns to exert a torque opposing the disturbing torque due to the damper at such time without affecting normal damping, and means for varying the extent of movement of said mass for different latitudes.

10. In a gyro-compass having a damping means which causes a disturbing force causing deviation during or following a change of speed or course of the ship, the combination with said damping means, of means for exerting on the compass during a change of speed or course of the ship a force which counteracts the force exerted on the compass due to the action of such change of speed or course on the damping means without affecting the normal damping and without interfering with ballistic deflection.

11. In a gyro-compass having a damping means actuating about the vertical axis thereof which causes deviation during or following a change of speed or course of the ship, the combination with said damping means acting about the vertical axis, of means for exerting on the compass during a change of speed or course of the ship a force about said vertical axis which counteracts the force exerted on the compass due to the action of such change of speed or course on the damping means without affecting the normal damping and without interfering with ballistic deflection.

12. A directional gyroscope for vehicles comprising a rotor and rotor bearing casing, a substantially vertical ring in which said casing is pivoted on substantially horizontal trunnions at an angle to the spinning axis of the rotor, and an unbalanced mass on said ring to one side of the vertical plane containing said spinning axis whereby, when the vehicle accelerates or turns in the direction of said axis, a torque is exerted on said ring which is transmitted to said casing through said trunnions as a torque about a vertical axis.

In testimony whereof we have affixed our signatures.

CLAUDE D. FARMER.
WILLIAM R. HIGHT.